US008377200B2

(12) United States Patent
Delantar, Jr.

(10) Patent No.: US 8,377,200 B2
(45) Date of Patent: Feb. 19, 2013

(54) DÉCOR ITEMS

(76) Inventor: Pedro Delantar, Jr., Las Vegas, NV (US)

( * ) Notice: Subject to any disclaimer, the term of this patent is extended or adjusted under 35 U.S.C. 154(b) by 623 days.

(21) Appl. No.: 12/436,512

(22) Filed: May 6, 2009

(65) Prior Publication Data

US 2009/0280273 A1 Nov. 12, 2009

Related U.S. Application Data

(60) Provisional application No. 61/050,964, filed on May 6, 2008.

(51) Int. Cl.
*C04B 11/00* (2006.01)

(52) U.S. Cl. .................................................... 106/778

(58) Field of Classification Search .................. 106/772, 106/780, 778

See application file for complete search history.

(56) References Cited

U.S. PATENT DOCUMENTS

| | | | | |
|---|---|---|---|---|
| 4,174,230 | A * | 11/1979 | Hashimoto et al. | 106/660 |
| 5,240,500 | A * | 8/1993 | Retti | 106/778 |
| 5,749,964 | A * | 5/1998 | Mann | 106/805 |
| 7,052,544 | B2 * | 5/2006 | Langford | 106/778 |
| 2002/0129744 | A1 * | 9/2002 | Immordino et al. | 106/778 |
| 2007/0051281 | A1 * | 3/2007 | Nicholson et al. | 106/772 |
| 2008/0210136 | A1 * | 9/2008 | Petit et al. | 106/780 |
| 2008/0299413 | A1 * | 12/2008 | Song et al. | 428/689 |

* cited by examiner

*Primary Examiner* — Paul Marcantoni
(74) *Attorney, Agent, or Firm* — Fish & Richardson P.C.

(57) ABSTRACT

This document provides household and garden products, and methods for making such products. For example, household and garden products comprised of selected waste products from industrial processes combined with a binder are provided. In addition, products formed by mixing calcium sulfate dihydrate with a binder to form a mixture are provided.

7 Claims, 3 Drawing Sheets

DÉCOR ITEMS

CROSS-REFERENCE TO RELATED APPLICATIONS

This application claims the benefit of U.S. Provisional Application Ser. No. 61/050,964, filed May 6, 2008. The disclosure of the prior application is considered part of (and is incorporated by reference in) the disclosure of this application.

TECHNICAL FIELD

This document relates to house and garden wares. For example, materials and methods for producing house and garden wares formed from waste products of industrial processes are provided.

BACKGROUND

Some people choose décor elements that reflect their surroundings. For example, a person may adorn an apartment located in the heart of a progressive city with modern furnishings. On the other hand, some people enjoy reflecting the beauty of nature in their homes and offices, regardless of the location. In the latter case, often times a person considers an ethical dilemma on whether to consume natural products, e.g., woods, precious and non-precious stones, plants, and the like, in order to reflect a "natural" décor.

SUMMARY

In a general aspect, methods and materials for producing decorative household and garden items are provided. In another general aspect, products of the methods are provided. For example, a method for forming household and garden products that includes an inorganic salt as a main ingredient is provided. In some cases, the inorganic salt can be calcium sulfate dihydrate. In some embodiments, the inorganic salt can be mixed with a binder and cold-pressed into the shape of the desired household product. In some embodiments, the resulting product can be an aesthetically-pleasing shade of brown that resembles earthy tones and matter, without painting or staining.

In general, according to one aspect, a molded product is provided, the molded product including calcium sulfate dihydrate and a binder.

In general, according to another aspect, a molded product is provided that includes a mixture shaped into said product, said mixture comprising calcium sulfate dihydrate and a binder.

In some cases, the mixture further comprises a resin, and in some cases, the mixture further comprises cobalt. In select embodiments, the resin is unsaturated polyester resin. In some embodiments, the product can further comprise integrated earthy matter, such as pebbles, rocks, twigs, sticks, grass, leaves, fossils, crustaceans, shells, and lava rocks. In some embodiments, the product is one of: furniture, vases, pots, stands, utility holders, picture frames, garden decorative items, trellises, and faux rocks.

In another general aspect, a molded product is provided. The product is formed by a process comprising mixing calcium sulfate dihydrate, a binder, and a resin to form a mixture, and shaping said mixture into said product. In some cases, the process further includes adding earthy matter to said mixture that adds to a selected aesthetic quality of said product.

In yet another general aspect, a process is provided. The process includes mixing calcium sulfate dihydrate with a binder to produce a mixture comprising an earthy-brown color; and forming said mixture into a décor object.

In yet another general aspect, a process is provided. The process includes forming a household or garden décor item from a mixture comprising a waste product from an industrial process and a binder. In some embodiments, the industrial process is the process of making agricultural fertilizer, and in some embodiments the waste product is calcium sulfate dihydrate. The process can further include accenting said décor item with earthy matter selected from the group consisting of: pebbles, rocks, twigs, sticks, grass, leaves, fossils, crustaceans, shells, and lava rocks. In some alternative embodiments, the household or garden décor item made by the process can be one or more of: art work, furniture, vases, pots, stands, utility holders, picture frames, garden decorative items, trellises, and faux rocks. In one embodiment of the process, the binder is unsaturated polyester resin. In one embodiment, the process further includes using a cross-linking agent and hardener to harden the household or garden décor item. In an alternative embodiment of the process, the cross-linking agent is styrene monomer, and said hardener is methyl ethyl ketone peroxide.

In yet another general aspect, a product formed by one or more of the processes described herein is provided. The product can be characterized by similarity to naturally-occurring rock formations found in nature, and can possess an earthy-brown color.

Unless otherwise defined, all technical and scientific terms used herein have the same meaning as commonly understood by one of ordinary skill in the art to which this invention pertains. Although methods and materials similar or equivalent to those described herein can be used in the practice or testing of the present invention, suitable methods and materials are described below. In addition, the materials, methods, and examples are illustrative only and not intended to be limiting. In case of conflict, the present specification, including definitions, will control.

The details of one or more embodiments of the invention are set forth in the accompanying drawings and the description below. Other features, objects, and advantages of the invention will be apparent from the drawings and detailed description, and from the claims.

DETAILED DESCRIPTION

Figure 1:
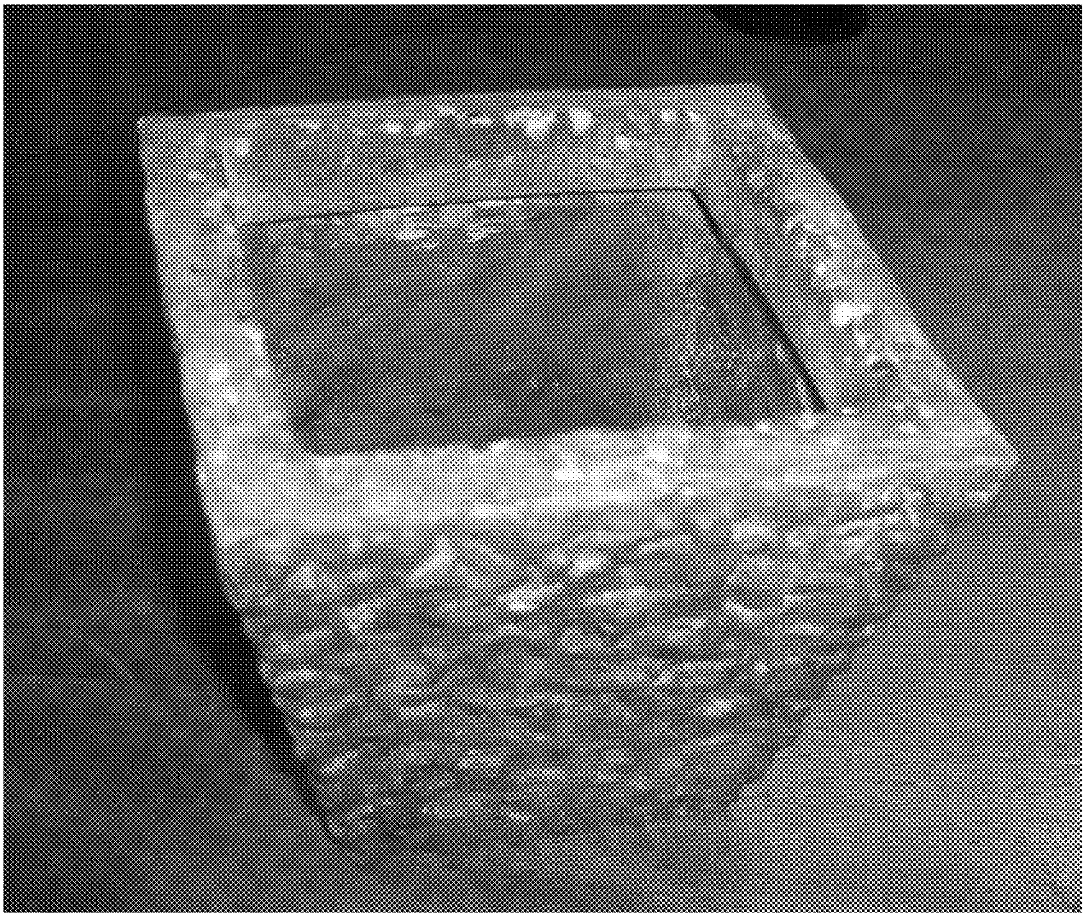
FIG. 1 is a photograph of a household decorative item according to one embodiment.
Figure 2:
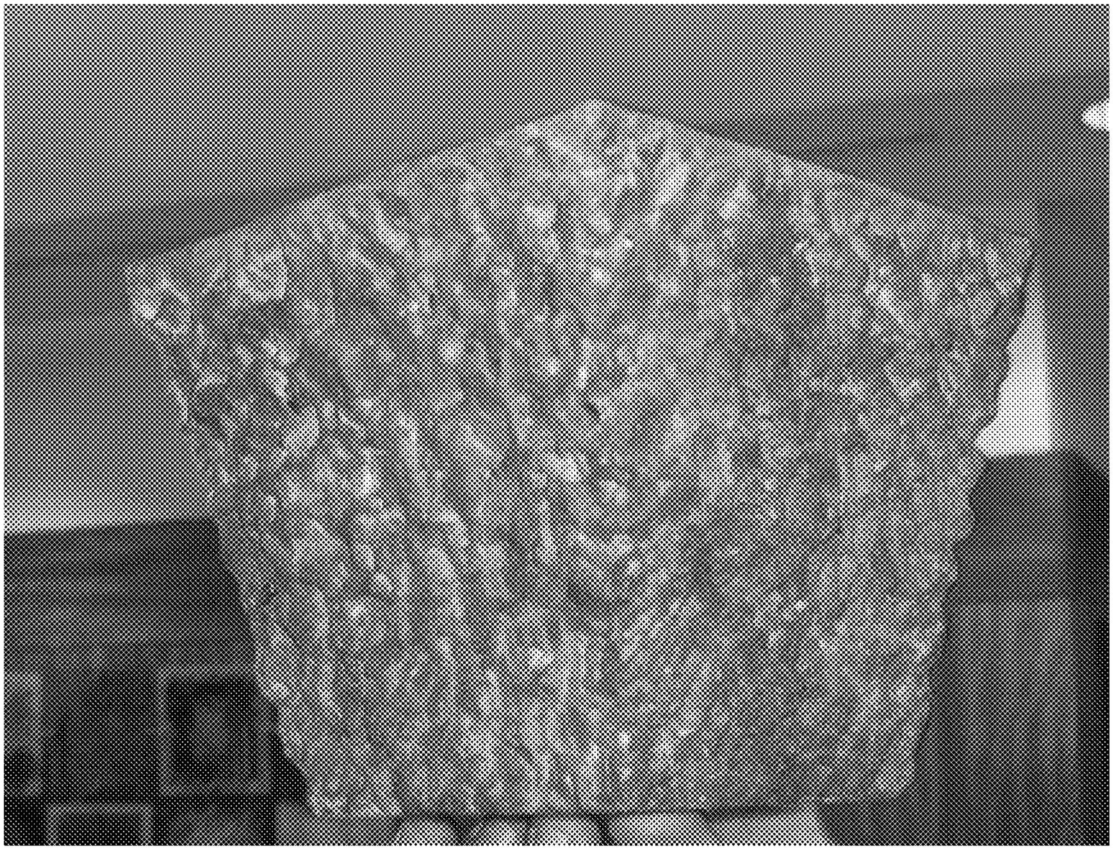
FIG. 2 is a photograph of the household decorative item of FIG. 1 from a side-view.
Figure 3:
FIG. 3 is a close-up photograph of the household decorative item of FIG. 1.

Decorative items are commonly present in home, offices, and other structures throughout the world. In some cases, decorative house wares are chosen and strategically placed to reflect a homeowner's sense of style, and, in some cases, to provide some level of functionality, such as to provide lighting to a certain area of a room. An environmentally-friendly option can include items made of recycled materials, such as biomass or by-products of industrial processes. Recycled materials can be used to produce environmentally friendly products and to reduce the impact of human consumption on global raw materials.

In general, molded decorative items (e.g., household and garden items) are provided that can be made from waste products of industrial processes. In one general embodiment, selected waste products from the manufacture of fertilizer can be mixed with binders and other ingredients to form a mixture. The mixture can be shaped into a mold of a selected decorative item. Exemplary decorative items can include furniture, vases, pots, stands, utility holders, picture frames, garden decorative items, e.g., trellises, faux rocks, and the like.

The mixtures provided herein can include waste products from the manufacture of fertilizer. In some cases, the waste product can be calcium sulfate dihydrate (CSD). In one general aspect, decorative household items can be made of a mixture that includes CSD, and a binding agent, among other ingredients (a "CSD mixture"). Binding agents can include, by way of example, glue, polyvinyl acetate glue, and other agents. In some embodiments, decorative household items can include CSD, a binder, and a resin, among other ingredients. Exemplary resins include unsaturated polyester resins. In further embodiments, the mixture can include CSD, a binder, a resin, and fiberglass, among other ingredients. Fiberglass can include fiberglass mats, strands, and bits, for example. In one general aspect, other waste product ingredients from fertilizer manufacture can be used in addition to, or in lieu of, CSD. In some embodiments, the mixture includes hardening agents. Exemplary hardening agents include methyl ethyl ketone peroxide (MEKPO) that can be used in conjunction with unsaturated polyester resin. In some embodiment, styrene monomer can be added to the mixture as a cross-linking agent. In some embodiments, cobalt is added to the mixture. Exemplary uses of cobalt include its use as a drying agent or pigment.

The process of shaping one of the aforementioned mixtures into the form of a decorative household or garden item can be accomplished by hand, i.e., manually. In some embodiments, the shaping can be performed by machine, and in yet other embodiments, the shaping may be performed using a combination of hand and machine processes. In some embodiments, the shaping process can include forming a reinforcing structure in the shape of the desired decorative item and applying the mixture thereto. An exemplary reinforcing structure may include stiff wire mesh that is shaped into the general form of the desired decorative item. The mixture can then be applied to desired surfaces of the reinforcing structure. The reinforcing structure can add increased structural stability and strength to the overall decorative item. Examples of materials used to reinforce the decorative item include gauze, paper, wire mesh, metal frames, cardboard, among other reinforcing items that will be known to those skilled in the art of molding. In some embodiments, once the mixture is shaped into a decorative item, either by forming the shape "freeform" or through the use of a mold, the mixture can be hardened by heat treating. In some cases, the mold can be hardened by allowing the mold to dry in air.

Calcium sulfate can be recovered from industrial processes using any appropriate method. In some cases, calcium sulfate can be a waste product from the manufacture of fertilizer and can be recovered directly. In some cases, calcium sulfate can be recovered as a product in flue gas desulfurization, where impure calcium sulfite is recovered and, over time, oxidizes to calcium sulfate. In some cases, calcium sulfate can be precipitated when calcium phosphate is treated with sulfuric acid, such as in the production of phosphoric acid from phosphate rock. In some cases, in the production of hydrogen fluoride, calcium fluoride can be treated with sulfuric acid, precipitating calcium sulfate. Calcium sulfate can also be recovered from drywall. In any of the aforementioned processes, calcium sulfate can be converted to CSD by chemical methods known in the art.

Mixtures of CSD such as those described above can have a selected malleability by properly proportioning the ingredients. For example, a soft, workable mixture can be provided by proportioning more liquid ingredients than solids. Similarly, a stiff mixture can be made by proportioning higher amounts of solid materials.

In some embodiments the styrene monomer can be present in the range of 5% to 30% by resin weight, for example, from 10% to 20% by weight, from 7.5% to 15% by weight, however, more or less styrene monomer can be used. In some embodiments the accelerator can include cobalt octoate. Cobalt octoate can be preferentially present in the polymer resin in the range of 0.2%-0.5% per resin weight, for example, 0.28% to 0.32% per resin weight, 0.25% to 0.35% per resin weight, 0.23-0.47% per resin weight, however, more or less of the cobalt compound can be used. In some embodiments, dimethyl aniline can be used as an accelerator using preferentially 0. 1%-0.2% by resin weight, for example, 0. 14%-0.16% by resin weight, 0. 12% to 0. 18% per resin weight, however, higher or lower concentrations may be used. In some embodiments, polymer methyl ethyl ketone peroxide (MEKPO) can be used as the catalyst (or hardener). When MEKP is used, it can preferentially be present in the polyester resin between 1%-3% by resin weight, for example, 2.8% to 3.2% by resin weight, 2.5% to 3.5% by resin weight, 2.2% to 3.8% by resin weight, although higher or lower concentrations may be used.

In some embodiments the ratio of CSD to polyester resin mix in the mixture can range from 2:1 to 4:1, for example from 2.2:1 to 3.8:1, from 2.5:1 to 3.5:1, from 2.7:1 to 3.3: 1, from 2.9:1 to 3.1:1. The consistency of the mixture of CSD to polyester resin can depend on the amount of resin used. A more fluid-like admixture results when less CSD is proportionally used. The ratio of CSD to resin can affect the texture of the resulting household or garden product, where higher ratios of CSD can result in a more textured appearance.

CSD can exhibit an off-white color when it is captured as a waste product. However, when CSD is mixed with a resin and formed into one of the mixtures described herein, the mixture can attain an aesthetically-pleasing, natural, earthy-brown color. The color can be retained throughout the process of shaping the mixture into a decorative household or garden item, including curing of the item and drying. Thus, in one embodiment, a household or garden item can be provided wherein the item is formed of a mixture of CSD, a resin, a binder, and optionally, cobalt. The mixture can be formed into a shape, and dried or cured. In some embodiments, the curing process can include applying heat to a formed mixture.

Household and garden items of the types described herein can include earthy matter to further supplement the natural look and aesthetic quality of the item. Non-limiting examples of earthy matter include pebbles, rocks, twigs, sticks, grass, leaves, fossils, crustaceans, shells, and lava rocks. In one aspect, the earthy matter can be assimilated into a CSD mixture and shaped into a mold or directly into a household or garden item as described herein. In some cases, earthy matter can be applied to a pre-cured or pre-dried household item that has been shaped into a household item using a mixture that includes CSD, binders, and other ingredients. The earthy matter can be selectively placed on the exterior of the item while the mixture is still malleable, allowing the matter to dry in place when the item is cured.

In some cases, a household or garden item can be constructed by shaping the item in one contiguous piece. For example, a vase can be constructed by fashioning a base onto a portion that includes side walls and an aperture at the top. In some cases, a household item can be constructed using several pre-formed, pre-cured pieces that are joined together using additional CSD mixture as "glue" to hold the pieces together. In general, the CSD mixture can be worked in a similar fashion as clay.

Household and garden items composed of CSD mixtures, if properly proportioned, can retain liquid, i.e., they can be substantially non-porous. In some embodiments, the porosity of the final product can depend on the starting viscosity of the CSD mixture. For example, CSD, binder, and resin, can be proportioned until it is blended to a consistency suitable to retain liquids. This mixture can be shaped into a suitable form, e.g., a flower vase that can hold water.

The molded household or garden item can include impressions in the CSD mixture to lend further aesthetic quality to the product. Impressions can include, by way of example only, dimples, divots, scoops, recessions, and also "negative" impressions of objects, such as rocks, shells, pebbles, twigs, and the like.

A household or garden item provided herein can be formed and decorated to match a selected environment. For example, a household item can include rocks, wood products, grasses, and the like from the local environment to match a given décor.

A surface of the household or garden item can have a rough texture. In some embodiments, an exterior surface of a molded household item can have a rough texture while an interior surface can have a smooth surface. In one general aspect, a rough surface of a household or garden item formed from a CSD mixture can be generally characterized by having cracks, fissures, stratifications, and other elements that resemble naturally-occurring rocks and rock formations. In some cases, a household or garden item provided herein can closely resemble naturally-occurring deposits of gypsum, which can be visually interesting and artistic. For example, a household or garden item provided herein can appear fine-grained, granular, or crystalline. This aspect, combined with the aforementioned natural color tones of the product, can lead to a product that substantially resembles naturally occurring rocks and minerals. In one general aspect, the resulting product can include features that closely resemble small, granular, fossil-like formations.

Other Embodiments

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims. For example, while the foregoing discussion describes collecting calcium sulfate dihydrate from the waste products of fertilizer manufacture, indeed "pure" calcium sulfate dihydrate can be used to create the molded decorative household items described above. Likewise, calcium sulfate and variants of calcium sulfate (e.g., calcium sulfate hemihydrate $CaSO_4$ $0.5H_2O$) may equally be used in combination with, or as a substitute for, CSD.

What is claimed is:

1. A molded, cold-pressed vase or pot product, wherein said product comprises rocks or pebbles, calcium sulfate dihydrate, and an unsaturated polyester resin.

2. The molded, cold-pressed vase or pot product of claim 1, wherein said molded, cold-pressed vase or pot product comprises an appearance similar to a naturally-occurring rock formation found in nature and an earthy-brown color.

3. The molded, cold-pressed vase or pot product of claim 1, wherein said product comprises earthy matter selected from the group consisting of twigs, sticks, grass, leaves, fossils, crustaceans, shells, and lava rocks.

4. A molded vase or pot product, wherein said molded vase or pot product is formed by a molding process comprising mixing rocks or pebbles, calcium sulfate dihydrate, and an unsaturated polyester resin to form a mixture, and cold-pressing said mixture into a shape of a vase or pot to form said molded vase or pot product.

5. The molded vase or pot product of claim 4, wherein said molded vase or pot product comprises earthy matter selected from the group consisting of twigs, sticks, grass, leaves, fossils, crustaceans, shells, and lava rocks.

6. The molded vase or pot product of claim 4, wherein said molded vase or pot product comprises cobalt.

7. The molded, cold-pressed vase or pot product of claim 4, wherein said molded vase or pot product comprises an appearance similar to a naturally-occurring rock formation found in nature and an earthy-brown color.

* * * * *